Figure 1:
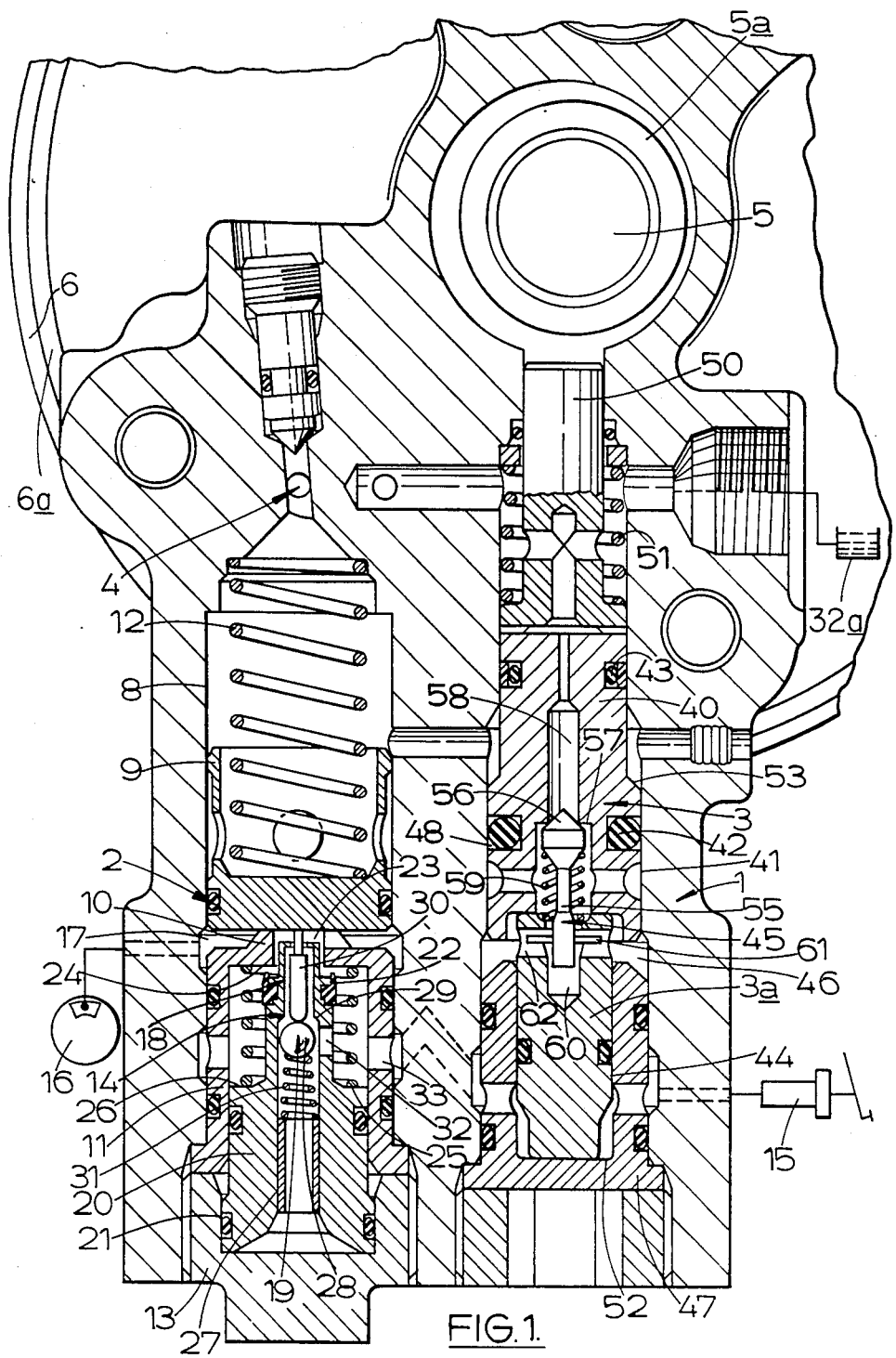

United States Patent [19]

Yardley

[11] Patent Number: 4,725,104
[45] Date of Patent: Feb. 16, 1988

[54] IMPROVEMENTS IN HYDRAULIC ANTI-SKID BRAKING SYSTEMS FOR VEHICLES

[75] Inventor: Alfred Yardley, West Midlands, England

[73] Assignee: Lucas Industries Public Limited Company, England

[21] Appl. No.: 36,153

[22] Filed: Apr. 3, 1987

Related U.S. Application Data

[63] Continuation of Ser. No. 707,439, Mar. 1, 1985, abandoned.

[30] Foreign Application Priority Data

Mar. 7, 1984 [GB] United Kingdom ............... 8405903
Jul. 2, 1984 [GB] United Kingdom ............... 8416803

[51] Int. Cl.$^4$ ..................... B60T 8/42; B60T 8/40; F16K 31/36
[52] U.S. Cl. ..................... 303/115; 137/508; 303/116
[58] Field of Search ............... 303/115, 113, 116, 117, 303/10, 61, 68; 137/508; 251/77; 415/123

[56] References Cited

U.S. PATENT DOCUMENTS

| 1,139,455 | 5/1915 | Gase | 137/508 X |
| 1,654,602 | 1/1928 | Reynolds | 137/508 X |
| 4,401,348 | 8/1983 | Farr | 303/116 |
| 4,606,585 | 8/1986 | Farr et al. | 303/115 X |

Primary Examiner—Andres Kashnikow
Assistant Examiner—Robert J. Oberleitner
Attorney, Agent, or Firm—Laff, Whitesel, Conte & Saret

[57] ABSTRACT

In an hydraulic anti-skid braking system of the pump and de-boost type operation of the pump is initiated by an operating piston co-operating with the plunger of the pump. There is a danger that fluid trapped in a chamber between adjacent ends of the piston and the plunger by a one-way valve of the pump may cause the pump to operate accidentally. This is prevented by adapting the one-way valve to act as a pressure relief valve and establish a return path from the chamber to a reservoir when the plunger has moved relatively away from the piston through a predetermined distance insufficient for the plunger to co-operate with a drive mechanism.

8 Claims, 2 Drawing Figures

IMPROVEMENTS IN HYDRAULIC ANTI-SKID BRAKING SYSTEMS FOR VEHICLES

This is a continuation of application Ser. No. 06/707,439, filed Mar. 1, 1985, now abandoned.

This invention relates to hydraulic anti-skid braking systems for vehicles of the kind in which a supply of operating fluid from a supply to a vehicle brake is modulated by a modulator assembly in accordance with skid signals from skid sensing means, and an hydraulic pump incorporating at least one plunger working in a bore has a working chamber which is in communication with the modulator assembly to control brake re-application following skid correction.

In the anti-skid braking systems described in GB-A No. 2029914 and GB-A No. 2069640 which is equivalent to U.S. Pat. No. 4,401,348 the modulator assembly comprises a bore in which works a de-boost piston for co-operation with a control valve assembly adapted to control communication between the supply of operating fluid and the brake through an expansion chamber defined in the bore between the piston and the control valve assembly. Normally the piston is held in an inoperative advanced position by a trapped volume of fluid supplied by the pump and, in this position, the valve assembly is fully open and the effective volume of the expansion chamber is at a minimum. When a skid signal is produced the trapped volume of fluid is released which permits the piston to move into a retracted position, initially to permit the valve assembly to close and isolate the supply from the brake, and subsequently to increase further the effective volume of the expansion chamber, whereby to relieve the brake-applying pressure. Following correction of the skid, the pressure from the pump is operative to urge the piston towards its advanced position, initially to re-apply the brake by pressurising the fluid in the expansion chamber, and subsequently opening the valve assembly to re-establish communication between the supply and the brake.

In the modulator assemblies of GB-A No. 2029914 and GB-A No. 2069640 the trapped volume of fluid supplied by the pump to the de-boost piston also acts over an area of a plunger of the pump to hold the pump disabled with the plunger out of co-operation with a drive mechanism, and an operating piston responsive to pressure from the supply urged into engagement with a stop by the direct co-operation of the plunger with the adjacent end of the piston. A space containing a trapped volume of fluid at the same pressure as that acting on the de-boost piston is defined between adjacent ends of the plunger and the piston by adjacent portions of the bores in which the plunger and the piston work. At the end of an anti-lock cycle following correction of a skid the trapped volume of fluid in the said space may act to hold the plunger in an advanced position in which it may co-operate with the drive mechanism. Although this will not normally be sufficient for operation of the pump to take place, nevertheless undesirable vibration and noise may occur. Such a tendency will increase in the event of expansion of the fluid so trapped, for example due to a substantial increase in local temperature.

According to our invention in an hydraulic anti-skid system of the kind set forth the modulator assembly comprises a bore in which works a de-boost piston for co-operation with a control valve assembly adapted to control communication between the supply of operating fluid and the brake, and a trapped volume of fluid for holding the de-boost piston in an inoperative advanced position is supplied to the de-boost piston by the pump, the pump comprising a plunger working in a pump bore, a drive mechanism for urging the plunger in one of two opposite directions, and an operating piston responsive to pressure from the supply and co-operating directly with the plunger to urge the plunger towards the drive mechanism, the plunger having an area over which the trapped volume of fluid also acts to hold the plunger in a disabled position out of co-operation with the drive mechanism and in which the operating piston is held in a retracted position against a stop, and a space is defined between adjacent ends of the piston and the plunger by adjacen portions of the bores in which the plunger, and the operating piston work, a pressure-relief valve being operable to relieve the pressure in the said space upon the plunger and the operating piston moving relatively away from each.

Normally the pressure-relief valve is operative to relieve the pressure in the space only after the plunger and the piston have moved relatively away from each other through a predetermined distance less than that required to bring the plunger into co-operation with the drive mechanism. Thus any tendency for the plunger to cooperate with the drive mechanism accidently is prevented.

Preferably the pressure-relief valve is operative to return the fluid in the space to a reservoir upon relative movement between the plunger and the operating piston through the predetermined distance.

The pressure-relief valve conveniently comprises a valve member adapted to be held in engagement with a seating in the plunger by a spring to isolate the space from the reservoir with the operating piston co-operating with the plunger during operation of the pump, the valve member being withdrawn from the seating upon separation of the adjacent ends of the plunger and the operating piston through the said predetermined distance.

The valve member may comprise a headed stem coupled to the operating piston through a lost-motion connection, or it may comprise a ball carried by the operating piston in a retainer by means of which the ball is retained against excessive movement with the plunger as the plunger separates from the operating piston.

The pressure relief valve may comprise a one-way valve through which fluid is drawn into a pumping space constituted by the said space on the induction stroke of the plunger, and from which the fluid is displaced through a second one-way valve to provide the trapped volume, on the power stroke of the plunger.

Figure 2:
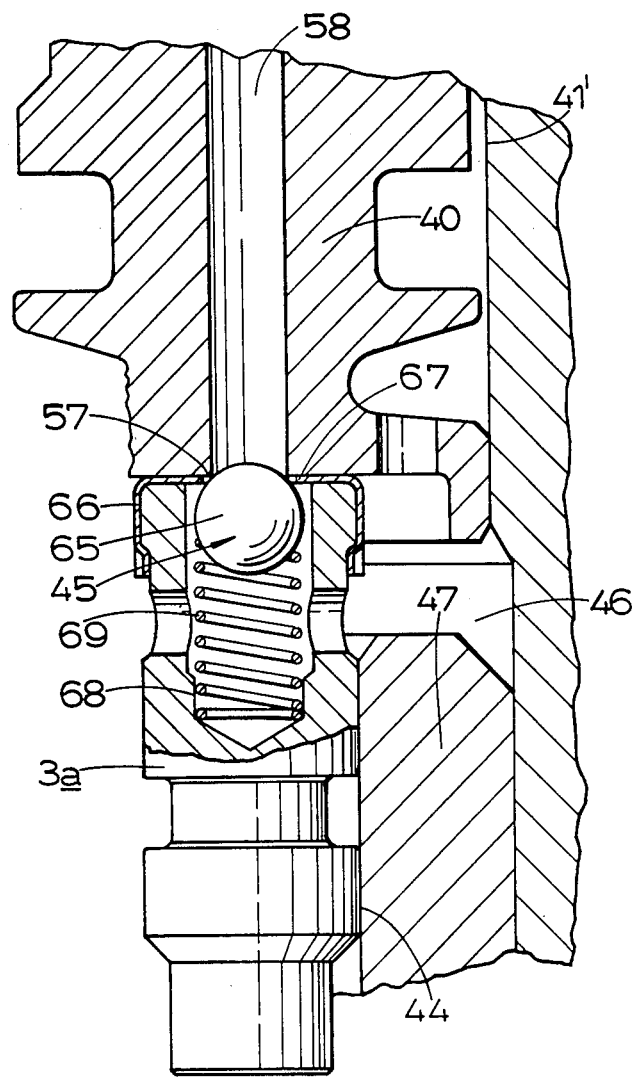

Two embodiments of our invention are illustrated in the accompanying drawings in which:

FIG. 1 is a transverse section through a combined modulator and skid sensing assembly for an hydraulic anti-skid braking system suitable for a motor-cycle or light passenger car or van; and FIG. 2 is a section on an enlarged scale of a portion of the pump but showing a modification.

The assembly illustrated in FIG. 1 of the drawings comprises a housing 1 incorporating a modulator assembly 2, a hydraulic pump assembly 3, and a pressure dump valve 4. A longitudinally extending shaft 5 projecting at opposite ends through the housing 1 is coupled at one end to a wheel to be braked and at the other end carries skid sensing means 6a which is enclosed within a cylindrical guard 6 carried from an adjacent end of the housing 1.

The dump valve 4 and the skid sensing means may be of any of the forms disclosed in GB-A No. 2029914, and the pump assembly 3 forms the subject of GB-A No. 2069640. The pump 3 is urged in one direction by an eccentric 5a on the shaft 5 and in the opposite direction by pressure from a pedal-operated master cylinder 15 which acts over an operating piston 3a. The pump 3 will be described more fully later.

The modulator assembly 2 comprises a bore 8 extending from the dump valve 4 and in which works a de-boost piston 9. The piston 9 is normally urged into an inoperative position against a stop comprising a wall 10 at the closed end of a sleeve 11 substantially of cup-shaped outline by means of a spring 12, and the sleeve 11 is retained in the bore 8 by means of a closure 13 for the end of the bore 8 remote from the dump valve 4.

A control valve assembly 14 housed in the sleeve 11 controls communication between the pedal-operated master cylinder 15 and a wheel brake 16 through an expansion chamber 17 defined in the bore 8 between the piston 9 and the control valve assembly 14 itself.

The control valve assembly 14 comprises a first valve 18, and a second valve 19 which are operative sequentially.

The first valve 18 comprises a first valve member 20 in the form of a stepped piston having a portion of intermediate diameter working in the bore of the sleeve 11, an outer portion of largest diameter working in a blind bore 21 of the closure 13, an inner portion of smaller diameter carrying an annular seal 22 which defines a valve head, and an innermost portion of smallest diameter which projects into a circular opening 23 in the wall 10. The valve head 22 is engageable with a seating 24 comprising an annulus on the wall 10 which surrounds the opening. Normally the head 22 is spaced from the seating 24 by means of a spring 25 which acts between the wall 10 and a shoulder 26 at the step in diameter between the intermediate and the smaller diameter portions of the piston 20.

The piston 20 has an open-ended longitudinally extending bore 27 of stepped outline in which the second valve 19 is housed. The second valve 19 comprises a valve member 28 in the form of a ball which is engageable with a seating 29 defined by a shoulder at the step in diameter of the bore 27. The ball 28 is normally urged away from the seating 29 by a probe 30 with which the piston 9 co-operates against the force in a light compression spring 31.

In the normal inoperative position shown in the drawing the dump valve 4 is closed so that the piston 9 is held in an inoperative advanced position in which the second valve 19 is held open by the probe 30, and the first valve is held open by the spring 25.

When the brake is to be applied by operation of the master cylinder 15, hydraulic fluid is supplied to the brake through radial ports 33 in the wall of the sleeve 11, and through the open first valve 18 to the expansion chamber 17. Simultaneously fluid also enters the through-bore 27 through a port 32 in the wall of the piston 20 and can pass to the expansion chamber through the open second valve 19. Thus there is a substantially unrestricted flow of fluid to the brake.

Fluid from the master cylinder acts on the shoulder 26 at the step in diameter, over the valve head 22, and over the outer end of the piston 20 which is of greatest area. The unrestricted communication continues until the pressure from the master cylinder 15 attains a predetermined value such that the force acting on the piston 20 due to the pressure acting over the end of greatest area overcomes the force in the spring 25 plus the force due to that pressure acting over the shoulder 26 and the head 22. The first valve 18 then closes, and any further pressure increase can only take place at a reduced rate by flow through a restricted path comprising the clearance between the valve member 28 and the seating 29.

When a skid signal is received the dump valve 4 opens to release the volume of fluid trapped in the bore 8 so that the piston 9 can retract against the force in the spring 12 initially to allow the second valve 19 to close since the pressure at which a skid signal can be emitted is higher than that at which the first valve 18 will have closed. This cuts-off communication between the master cylinder 15 and the brake 16, and the retraction of the piston 9 continues to increase the effective volume of the expansion chamber 17, whereby to relieve the pressure applied to the brake 16.

Opening the dump valve 4 also unbalances the pump 3 causing it to pump fluid in a closed circuit into the bore 8 from a reservoir 32a to which it is returned, through the dump valve 4. Since communication between the piston 3a and the master cylinder 15 is unrestricted, the pump 3 can move freely.

At the termination of the skid signal the dump valve 4 closes to isolate the bore 8 from the reservoir 32a and the pump 3 is then operative to increase the pressure in the bore 8, with the result that the piston 9 is urged towards its inoperative, advanced, position. Initial movement of the piston 9 in this direction re-applies the brake 16 by pressurising the volume of fluid trapped in the expansion chamber 17, and subsequent movement opens the second valve 19 to establish a restricted flow from the master cylinder to the expansion chamber 17 through the clearance between the ball 28 and the seating 29. Thus the first valve 18 closes at a predetermined pressure independent of the movement of the piston 9. The second valve 19 is closed and opened by movement of the piston 9 away from and towards its stop 10 on the sleeve 11. When the pressure from the master cylinder 15 is reduced below a predetermined value, the first valve 18 re-opens to provide a free and unrestricted communication between the master cylinder 15 and the brake 16.

The pump 3 comprises a plunger in the form of a differential first piston 40 working in a stepped bore 41. The two portions of the piston 40 each carry a respective seal 42, 43.

The operating piston 3a co-operates with the adjacent end of the piston 40, and a bore 44 in which it works is continuous with the stepped bore 41.

A first one-way valve 45 is housed in the piston 40 and past which fluid is drawn into a pumping space 46 defined in the bores 41 and 44 upon movement of the piston 40 relatively away from a closure 47 for the open end of the bore 41 and provided with the bore 44 in which the operating piston 3a works. Upon movement of the piston 40 in the opposite direction fluid is displaced into the bore 8 from the pumping chamber 46 and past a second one-way valve defined, in a known manner, by the engagement of the seal 42 with the bore 41 and the axially spaced walls of a groove 48 in which it is housed.

The one-way valve 45 comprises a stem 55 carrying an enlarged head 56 for engagement with a seating 57 at the inner end of a bore 58 in the piston 40 which leads to the reservoir 32. A spring 59 acting between the head 56 and the adjacent end of the piston 3a urges the head 56 towards the seating 57. The stem 55 is extended axially into a complementary fluid bore 60 in the adjacent end of the operating piston 3a and carries a transverse pin 61 which defines a lost-motion connection with the piston 3a, being received in a transverse bore 62 of a diameter substantially greater than that of the pin 61.

In operation, the piston 40 is urged inwardly during the induction stroke by the eccentric 5a which acts on the piston 40 through a tappet 50, and the tappet 50 is biassed away from the eccentric 5a by means of a spring 51.

In an inoperative position when the pump 3 is disabled at b.d.c. (bottom dead center) the operating piston 3a is held in a retracted position against a stop defined by a face 52 at the outer end of the bore 44, and the piston 40 is retracted against the inner end of the piston 3a by the trapped volume of fluid in the bore 8 acting over a shoulder 53 on the piston 3a at a step at the change in diameter. In this position the one-way valve 45 is normally closed and fluid is therefore trapped in the pumping space 46.

The relative spacing between the piston 40 and the piston 3a depends upon the volume of fluid trapped in the pumping space 46 at the same pressure as that applied to the bore 8. When the position of the tappet 50 and the piston 40 at the termination of an anti-lock cycle, is not at b.d.c. and is such that the piston 40 has separated from the piston 3a by a distance sufficient to take up the lost-motion in the connection, the seating 57 moves relatively away from the head 56 which is restrained from further movement with the piston 40 by the co-operation of the pin 61 with the wall of the bore 62. This relieves the pressure in the pumping space 46 by opening a return path to the reservoir 32, and further movement of the piston 40 in the same direction is prevented.

The degree of lost-motion is chosen to ensure that the one-way valve 45 will open to relieve the pressure in the pumping space 46, before the piston 40 can separate from the piston 3a through a distance which otherwise would be sufficient for the tappet 50 to engage with the eccentric 5a.

In the modified construction illustrated in FIG. 2 of the drawings, the one-way valve 45 comprises a ball 65 which is urged into engagement with the seating 57 by means of the spring 69 acting between the ball 65 and the inner end of a recess 68 in the piston 3a in which it is housed. The inner end of the operating piston 3a is enclosed within a retainer 66 in the form of a thimble of which the skirt is crimped around the piston 3a, and the end wall is provided with a central aperture 67 through which the ball 65 projects for engagement with the seating 57.

When the piston 40' separates from the operating piston 3a as described above, movement of the ball 65 with the piston 40' under the influence of the spring 68 is arrested by the engagement of the flange surrounding the aperture 67 with ball 65. The one-way valve 45 opens upon subsequent movement of the piston 40' relative to the piston 3a in the same direction to relieve the pumping space 46 to the reservoir 32 as described above.

The construction of the one-way valve 45 of FIG. 2 is otherwise the same as FIG. 1 and corresponding reference numerals have been applied to corresponding parts.

I claim:

1. A hydraulic anti-skid braking system for vehicles comprising a vehicle brake, a supply for operating fluid for applying said brake, skid sensing means for sensing the pressure of skid conditions at a wheel during a braking thereof and thereupon to produce skid signals, a modulator assembly for modulating the supply of fluid from said supply to said brake in accordance with said skid signals, a reservoir for fluid, and a hydraulic pump for controlling brake re-application following correction of said skid by withdrawing fluid from said reservoir, said pump incorporating at least one first piston having an axial passage leading to said reservoir and a working chamber associated with said first piston and in communication with said modulator assembly, wherein said modulator assembly comprises a housing having a bore, a de-boost piston working in said bore and movable between an advanced non-operative position and a retracted position, a control valve assembly with which said de-boost piston is adapted to cooperate and which is adapted to control communication between said brake and said supply, means in said bore defining a space in communication with said working chamber and in which a volume of fluid from said pump is adapted to be trapped to hold said de-boost piston in said non-operative advanced position, said housing having a pump bore, and said pump comprising said first piston working in said pump bore, a drive mechanism for urging said first piston in one of two opposite directions, an operating second piston responsive to pressure from said supply and cooperating directly with said first piston to urge said first piston through a first distance toward said drive mechanism, and a stop, said first piston having an area over which said trapped volume of fluid also acts to hold said first piston in a disabled position out of co-operation with said drive mechanism and in which said operating second piston is held in a retracted position against said stop, and a space is defined between adjacent ends of said second piston and said first piston by adjacent portions of said working chamber in which said first piston and said operating second piston work, wherein a pressure-relief valve is operable to relieve pressure in the said space upon said first piston and said operating second piston moving relatively away from each other, and said pressure-relief valve comprises a seating on said first piston at one end of said axial passage, a valve member for co-operating with said seating to normally prevent flow from said space through said axial passage to said reservoir, and coupling means including a lost-motion connection arranged to enable said valve member to be positively withdrawn from said seating when said pistons move relatively away from each other through a predetermined distance which exceeds said lost-motion in said lost-motion connection whereby fluid trapped in said space is relieved to said reservoir, said lost-motion connection comprising a coupling member carried by said second piston, said valve member having a stop part, a spring acting on said valve member to urge said valve member toward said seating and said stop part toward said coupling member, means defining an engagement between said valve member and said seating to establish said lost-motion when said first and second pistons are in engagement, relative movement between said first and second pistons in a direction away from each other through a second distance exceeding said lost-motion but less than said first distance urging said coupling member into engagement with said stop part whereafter to withdraw said valve member from said seating.

2. A system as claimed in claim 1, wherein said pressure relief valve is operative to relieve said pressure in said space only after said first piston and said second piston have moved relatively away from each other through a predetermined distance less than that required to bring said first piston into co-operation with said drive mechanism.

3. A system as claimed in claim 1, wherein said pressure-relief valve is operative to return the fluid in said space to a reservoir upon relative movement between said first piston and said operating piston through said predetermined distance.

4. A system as claimed in claim 3, wherein said pressure relief-valve comprises a valve member for co-operation with a seating in said first piston, a spring for urging said valve member into engagement with said seating to isolate said space from said reservoir with said operating piston co-operation with said first piston during operation of said pump, said valve member being withdrawn from said seating upon separation of adjacent ends of said first piston and said operating piston through the said predetermined distance.

5. A system as claimed in claim 4, wherein said valve member comprises a headed stem and said stem is coupled to said operating piston by said coupling.

6. A system as claimed in claim 4, wherein said valve member comprise a ball carried by said operating piston, and a retainer is provided by means of which said ball is retained against excessive movement with respect to said operating piston as said first piston separates from said operating piston.

7. A system as claimed in claim 1, wherein said pressure relief valve comprises a one-way valve through which fluid is drawn into a pumping space constituted by the said space on an induction stroke of said first piston, and from which said fluid is displaced through a second one-way valve to provide the trapped volume on an power stroke of said first piston.

8. A hydraulic anti-skid braking system for wheeled vehicles comprising a vehicle brake, a supply for operating fluid for applying said brake, skid sensing means for sensing the pressure of skid conditions at a wheel during braking and thereupon to produce skid signals, a modulator assembly for modulating the supply of fluid from said supply to said brake in accordance with said skid signals, a reservoir for fluid, and a hydraulic pump for controlling brake re-application following correction of said skid by withdrawing fluid from said reservoir, said pump incorporating at least one first piston having an axial passage leading to said reservoir and a working chamber associated with said first piston and in communication with said modulator assembly, wherein said modulator assembly comprises a housing having a bore, a de-boost piston working in said bore and movable between an advanced non-operative position and a retracted position, a control valve assembly with which said de-boost piston is adapted to co-operate and which is adapted to control communication between said brake and said supply, means in said bore defining a space in communication with said working chamber and in which fluid from said pump is adapted to be trapped to hold said de-boost piston in said non-operative advanced position, said housing having a pump bore, and said pump comprising said first piston working in said pump bore, a drive mechanism for urging said first piston in one of two opposite direction, first and second one-way valves through which fluid is drawn from said reservoir into said working chamber, and through which fluid is pumped from said working chamber to said modulator assembly, an operating second piston responsive to pressure from said supply and co-operating directly with said first piston to urge said first piston through a first distance towards said drive mechanism, and a stop, said first piston having an area over which said trapped volume of fluid also acts to hold said first piston in a disabled position out of co-operation with said drive mechanism and in which said operating second piston is held in a retracted position against said stop, and a space is defined between adjacent ends of said second piston and said first piston by adjacent portions of said bore in which said first piston and said operating second piston work, said first one-way valve comprising a seating on said first piston at one end of said axial passage, a valve member for co-operating with said seating normally to prevent flow from said space through said axial passage to said reservoir, and a spring urging said valve member towards said seating, wherein a coupling is provided between said valve member and said second piston to urge said valve member away from said seating when said pistons move through a predetermined second distance relatively away from each other, and means incorporated in said coupling define a degree of lost-motion which is adapted to be taken up during said relative movement of said pistons away from each other and before said valve member is urged away from said seating, said degree of lost-motion being less than said first distance through which said first piston is movable towards said drive mechanism.

* * * * *